United States Patent
Bhide et al.

(10) Patent No.: US 11,941,496 B2
(45) Date of Patent: Mar. 26, 2024

(54) PROVIDING PREDICTIONS BASED ON A PREDICTION ACCURACY MODEL USING MACHINE LEARNING

(71) Applicant: International Business Machines Corporation, Armonk, NY (US)

(72) Inventors: Manish Anand Bhide, Hyderabad (IN); Venkata R Madugundu, Hyderabad (IN); Harivansh Kumar, Hyderabad (IN); Prem Piyush Goyal, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 16/823,477

(22) Filed: Mar. 19, 2020

(65) Prior Publication Data

US 2021/0295204 A1    Sep. 23, 2021

(51) Int. Cl.
*G06N 20/00*  (2019.01)
*G06N 5/04*  (2023.01)

(52) U.S. Cl.
CPC .............. *G06N 20/00* (2019.01); *G06N 5/04* (2013.01)

(58) Field of Classification Search
CPC ........ G06N 20/00; G06N 3/0481; G06N 7/00; G06N 5/022; G06N 5/027; G06N 3/126; G06N 5/02; G06N 5/041; G06N 3/04; G06N 5/043; G06N 3/086; G06N 3/084; G06N 3/082; G06N 5/04; G06N 3/0454; G06N 20/10; G06N 5/003; G06N 20/20; G06N 7/005; G06N 3/0445; G06N 3/08
See application file for complete search history.

(56) References Cited

U.S. PATENT DOCUMENTS

| | | | |
|---|---|---|---|
| 9,875,440 B1 | 1/2018 | Commons | |
| 10,217,061 B2 | 2/2019 | Hayes et al. | |
| 10,650,326 B1 * | 5/2020 | Johnston | G06F 16/23 |
| 10,679,390 B1 * | 6/2020 | Solgi | G06K 9/6217 |
| 2011/0235900 A1 * | 9/2011 | Porikli | G06K 9/6253 |
| | | | 382/159 |

(Continued)

OTHER PUBLICATIONS

Walden, James, Machine Learning Performance Evaluation—CSC640: Advanced Software Engineering Northern Kentucky University, 2019 (Year: 2019).*

(Continued)

*Primary Examiner* — Scott L Jarrett
(74) *Attorney, Agent, or Firm* — Donald J. O'Brien

(57) ABSTRACT

Embodiments are disclosed for a method for machine-learning model accuracy. The method includes generating prediction training data based on training predictions and corresponding probabilities of the training predictions. A classifier of a machine-learning model generates the training predictions. The method also includes training a prediction accuracy model to determine whether the training predictions generated by the machine-learning model are correct. Additionally, the method includes generating predictions in response to corresponding client transactions for the machine-learning model. Further, the method includes determining whether the predictions are accurate using the prediction accuracy model. Also, the method includes providing client predictions corresponding to the client transactions based on the determination.

19 Claims, 8 Drawing Sheets

(56) References Cited

U.S. PATENT DOCUMENTS

| | | | | |
|---|---|---|---|---|
| 2013/0218813 | A1* | 8/2013 | Rinott | G16H 50/20 706/12 |
| 2015/0242761 | A1* | 8/2015 | Amershi | G06K 9/00536 706/11 |
| 2015/0254555 | A1* | 9/2015 | Williams, Jr. | G06N 3/084 706/14 |
| 2016/0071017 | A1* | 3/2016 | Adjaoute | G06Q 20/4016 706/52 |
| 2016/0162802 | A1* | 6/2016 | Chickering | G06N 20/00 706/12 |
| 2017/0061326 | A1* | 3/2017 | Talathi | G06V 10/454 |
| 2017/0091670 | A1* | 3/2017 | Gulin | G06N 20/00 |
| 2017/0177993 | A1 | 6/2017 | Draelos et al. | |
| 2017/0330109 | A1 | 11/2017 | Maughan et al. | |
| 2018/0157743 | A1* | 6/2018 | Hori | G06N 3/0445 |
| 2018/0276507 | A1* | 9/2018 | Marchezi | G06K 9/6257 |
| 2018/0276561 | A1* | 9/2018 | Pasternack | G06F 16/353 |
| 2019/0050723 | A1* | 2/2019 | Kong | G06K 9/6256 |
| 2019/0279043 | A1* | 9/2019 | Cataltepe | G06K 9/6263 |
| 2019/0295000 | A1* | 9/2019 | Candel | G06N 5/003 |
| 2020/0019884 | A1* | 1/2020 | McCourt, Jr. | G06N 20/00 |
| 2020/0151613 | A1* | 5/2020 | Yoo | G06F 11/3466 |
| 2020/0250580 | A1* | 8/2020 | Harman | G06N 7/005 |
| 2020/0364609 | A1* | 11/2020 | Scriven | G06F 40/40 |
| 2021/0034960 | A1* | 2/2021 | Khapali | G06N 3/08 |
| 2021/0116904 | A1* | 4/2021 | Schuster | G01H 11/00 |
| 2021/0201205 | A1* | 7/2021 | Chatterjee | G06N 3/044 |
| 2021/0224687 | A1* | 7/2021 | Goldszmidt | G06K 9/6268 |
| 2021/0256420 | A1* | 8/2021 | Elisha | G06N 5/04 |
| 2021/0271809 | A1* | 9/2021 | Huang | G06N 5/027 |
| 2021/0295204 | A1* | 9/2021 | Bhide | G06N 20/00 |
| 2021/0357805 | A1* | 11/2021 | Karim | G06F 3/0482 |

OTHER PUBLICATIONS

Corbiere, Charles et al., Addressing Failure Prediction by Learning Model Confidence Conference on Neural Information Processing Systems, 2019 (Year: 2019).*

Mishra, Aditya, Metrics to Evaluate your Machine Learning Algorithm Towards Data Science, Feb. 24, 2018 (Year: 2018).*

Jordan, Jeremy, Evaluating a machine learning model https://www.jeremyjordan.me/evaluating-a-machine-learning-model/, Jul. 21, 2017 (Year: 2017).*

Mell et al., "The NIST Definition of Cloud Computing", Recommendations of the National Institute of Standards and Technology, Sep. 2011, 7 pages.

* cited by examiner

PROVIDING PREDICTIONS BASED ON A PREDICTION ACCURACY MODEL USING MACHINE LEARNING

BACKGROUND

The present disclosure relates to machine-learning models, and more specifically, to machine-learning model accuracy.

In some scenarios, a deployed, production-level, machine-learning model can experience a drop in its accuracy over time. The reasons for this drop in accuracy may vary. However, it is possible to counter the drop and improve model accuracy by re-training the model with new training data. However, generating new training data and retraining machine-learning models can be challenging.

SUMMARY

Embodiments are disclosed for a method for machine-learning model accuracy. The method includes generating prediction training data based on training predictions and corresponding probabilities of the training predictions. A classifier of a machine-learning model generates the training predictions. The method also includes training a prediction accuracy model to determine whether the training predictions generated by the machine-learning model are correct. Additionally, the method includes generating predictions in response to corresponding client transactions for the machine-learning model. Further, the method includes determining whether the predictions are accurate using the prediction accuracy model. Also, the method includes providing client predictions corresponding to the client transactions based on the determination.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
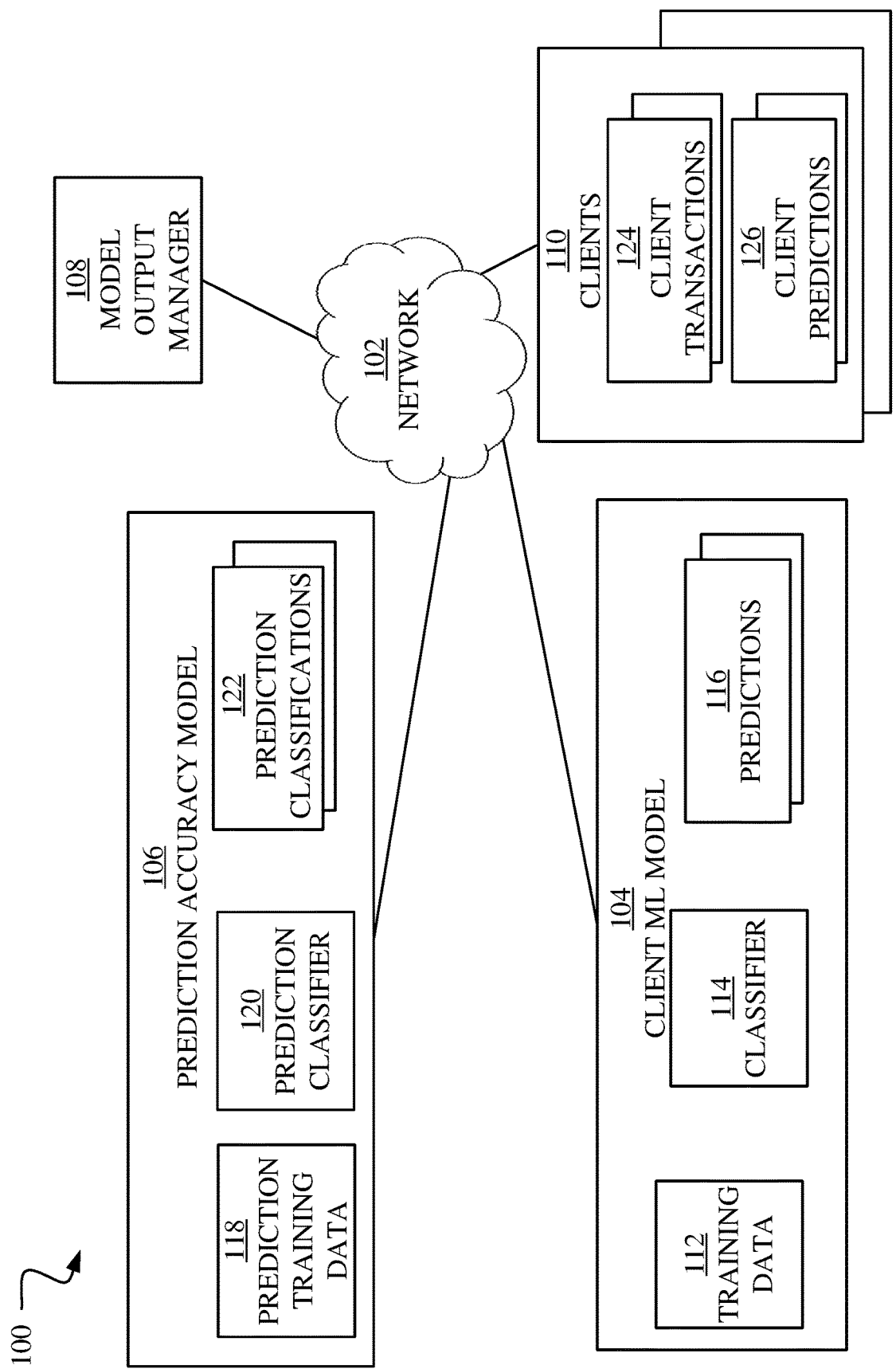
FIG. 1 is a block diagram of a system for machine-learning model accuracy, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

As stated previously, the accuracy of a machine-learning model can drop over time. Some techniques for mitigating and/or removing this drop in accuracy involve creating a proxy model. The proxy model can be a copy of the machine-learning model that can be used to identify new training data that may be useful for re-training the production model. However, creating proxy models and identifying new training data can be costly in terms of time, processing use, and the like.

Accordingly, embodiments of the present disclosure can include a system to improve the accuracy of a production-deployed machine-learning model without using a proxy model. Rather, embodiments of the present disclosure can generate a black-box proxy model that classifies predictions made by a client machine-learning model as correct or incorrect with a degree of confidence. Additionally, some embodiments can automatically correct the client ML model's predictions, thus improving the accuracy of the output provided for clients of the machine-learning model.

FIG. 1 is a block diagram of a system 100 for machine-learning model accuracy, in accordance with some embodiments of the present disclosure. The system 100 includes a network 102, client machine-learning (ML) model 104, prediction accuracy model 106, model output manager 108, and clients 110. The network 102 can be a network or collection of networks, such as a local area network and/or wide area network. In some embodiments, the network 102 can be the Internet.

The client machine-learning (ML) model 104 can be a machine-learning model trained to generate predictions regarding a specific classification problem. A classification problem can be a determination made by a classifier 114 of the client ML model 104 wherein the classifier 114 analyzes features of a particular scenario and makes a selection between multiple potential classes describing the scenario. For example, machine-learning classifiers can analyze the pixels of a digital photograph and classify the subject of the photograph as a human being or an animal in the wild. In this example, the human being and animal in the wild represent the potential classes of the classification problem. Additionally, the terms, classifying and classes, are also referred to herein as, labelling and labels, respectively.

In machine-learning, such scenarios are referred to as transactions or data points. The term, data point derives from the fact that each scenario can be represented as a set of data values in multi-dimensional space. In the digital photograph example, the collective red-green-blue (RGB) pixel color values of each digital photograph can represent a data point.

In some embodiments of the present disclosure, the client machine-learning model 104 can include training data 112, the classifier 114, and predictions 116. The training data 112 can be a collection of multiple transactions that are configured to train the classifier 114 to learn how to do its job: labelling transactions. The training data 112 can include transactions that are accurately labelled. Thus, the classifier 114 can analyze the features of each transaction and try to learn how to identify the features that correlate with particular classes. The classifier 114 can be a binary classifier or a multi-class classifier. A binary classifier can be a classifier that selects the label from two potential classes. The multi-class classifier can select from more than two potential classes.

In this way, the classifier 114 generates the predictions 116. The predictions 116 can include the labelled transactions, thus including the features and a label that the classifier 114 selects.

In machine-learning, training and re-training can be repeated periodically to help improve the accuracy of the predictions 116 of the client ML model 104. However, training and re-training machine-learning models can be costly in terms of resources. For example, creating new training data for re-training can involve inspecting the transactions manually and assigning the correct labels.

Accordingly, in embodiments of the present disclosure, the prediction accuracy model 106 can be a machine-learning model that can determine whether the predictions 116 are accurate. Further, the model output manager 108 can be a computer software and/or hardware architecture that uses the prediction accuracy model 106 to generate prediction training data 118, and train the prediction accuracy model 106 with the prediction training data 118 to identify accurate labels. Further, in response to requests for client transactions 124 from the clients 110, the model output manager 108 can provide client predictions 126 based on whether the predictions 116 are accurate. In cases where the prediction classifier 120 has determined the predictions 116 are accurate, the client predictions 126 can include the original predictions. In cases where the prediction classifier 120 has determined the predictions 116 are not accurate, the model output manager 108 can provide client predictions 126 with a newly selected label.

The prediction accuracy model 106 can include prediction training data 118, a prediction classifier 120, and prediction classifications 122. The prediction training data 118 can be a combination of the training data 112 and the predictions 116. The prediction classifier 120 can be a binary classifier that analyzes the predictions 116 of the client ML model 104 and determines whether the predictions 116 are accurate. In some embodiments of the present disclosure, the prediction training data 118 can include scored versions of the predictions 116. The scores of the prediction training data 118 can include probabilities for each of the potential classes. The probabilities can indicate how likely the classifier 114 has determined it is that the associated class is the correct label. Thus, the probability of the selected label may be greater than the probability of the label(s) not selected. Further, in some embodiments of the present disclosure, the prediction training data 118 can include a difference between the probabilities of the two most likely classes. For a binary classifier, this difference can represent the mathematical difference in probability values between the two classes. For a multi-class classifier, the difference can be between the two classes with the comparatively highest values of the potential classes.

The clients 110 can be computing devices that make requests of the client ML model 104 to generate the predictions 116 for client transactions 124. The client transactions 124 can be machine-learning model transactions with features that the classifier 114 may analyze to make the predictions 116. Accordingly, the client ML model 104 can generate predictions 116 for the client transactions 124 and the model output manager 108 can use the prediction accuracy model 106 to determine if the predictions 116 are accurate. Further, the model output manager 108 can generate client predictions 126 based on the determination. The client predictions 126 can include predictions that the prediction classifier 120 determines are accurate or newly selected labels in the case of predictions determined inaccurate. Additionally, the client predictions 126 can include the probabilities for each of the potential classes and a confidence score for the prediction classifier's confidence that the prediction classification 122 is correct.

Figure 2:
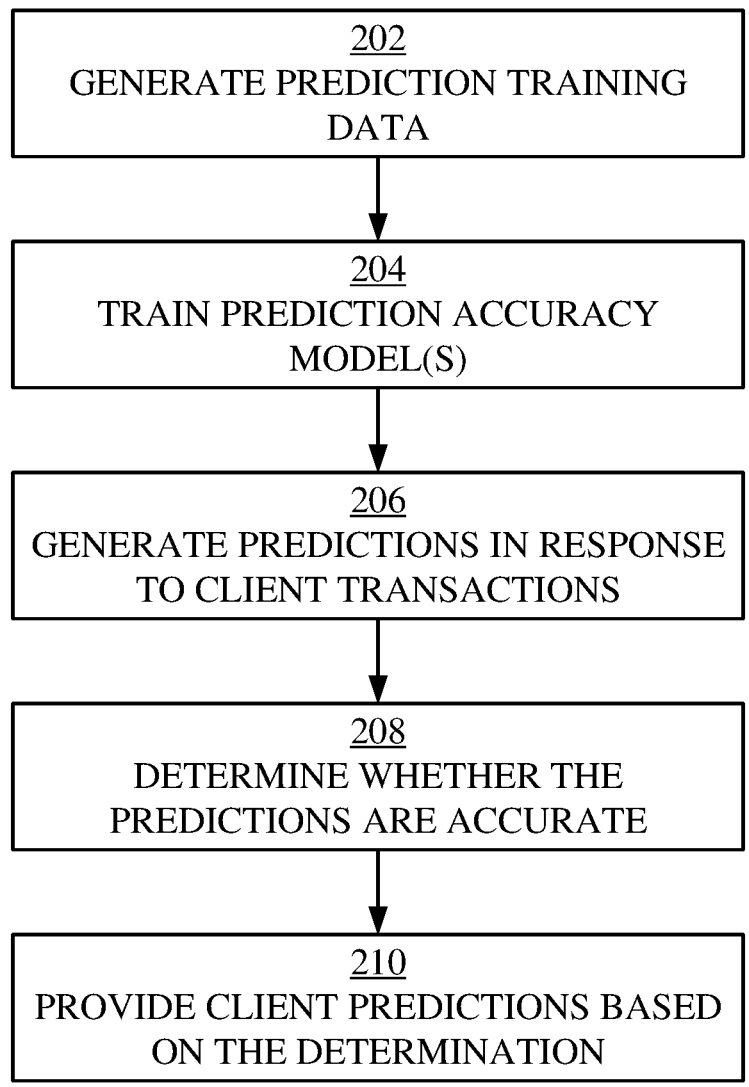
FIG. 2 is a process flow chart of a method for machine-learning model accuracy, in accordance with some embodiments of the present disclosure.

FIG. 2 is a process flow chart of a method 200 for machine-learning model accuracy, in accordance with some embodiments of the present disclosure. A model output manager and client ML model such as, the model output manager 108 and client ML model 104, respectively, can perform the method 200.

At operation 202, the model output manager 108 can generate prediction training data. In some embodiments, the model output manager 108 can generate prediction training data 118 based on the training data 112 and predictions 116 of the client ML model 104 described with respect to FIG. 1.

Generating the prediction training data 118 can involve using the training data 112 of the client ML model 104 and scoring all the transactions of the training data using the client ML model 104. The scoring can include the label selection and the probabilities of each possible label. Additionally, the model output manager 108 can combine the scoring with the training data 112 to create the prediction training data 118. The prediction training data 118 can include all the features used to train the client ML model 104, the label selection, probability scoring, and the difference in the comparatively top two probabilities of all the labels.

An example trained client model can predict the value of a label, L0, given specific values for features: F0, F1 and F2. In this example, the training data 112 can include features F0, F1, and F2. Additionally, a binary classifier can select the label L0 from two potential labels, A and B. Thus, the predictions 116 can include the predicted labels (value of L0=A or B). Further, the predictions 116 can include the probability of the accurate label being A (Pr_A) and the probability of the accurate label being B (Pr_B). Additionally, the predictions 116 can include the mathematical difference between the comparatively most likely probabilities.

For clarity, in this example the training data 112 is described in terms of columns and rows. The rows can represent each of the transactions of the training data. Further, the columns can include the individual values associated with the transaction. In this example, the training data 112 has 4 columns: F0, F1, F1, L0, and the predictions 116 have 3 columns: L0, Pr_A, and Pr_B. As stated previously, the prediction training data can be a combination of the training data 112 and the predictions 116. Thus, the prediction training data 118 can include these 7 columns.

Further, the training data 112 can include the accurate label. Thus, the output model manager 108 can determine whether the predicted label L0 is accurate. Accordingly, the prediction training data 118 can also include a column, L1, indicating whether the predicted label L0 is accurate. If, for example, in the training data 112, the accurate label is, "A," and the classifier 114 predicts the label is, "B," the output model manager 108 can set value of L1 to "No," indicating the prediction 116 is inaccurate. Thus, the prediction training data 118 can include columns F0, F1, F2, Pr_A, Pr_B, difference (|Pr_B−Pr_A|), L0, and L1. The prediction training data 118 used to build the prediction accuracy model 106 includes both the scoring output as well as input features of the client model 104. The prediction accuracy model's prediction classifier 120 so built can identify relatively strong patterns in scoring output and relatively moderate patterns in input features.

At operation 204, the model output manager 108 can train the prediction accuracy model 106 to determine whether client ML model predictions are correct. The client model predictions can include the predictions 116 described with respect to FIG. 1. Referring back to FIG. 4, the model output manager 108 can train the prediction accuracy model 106 using the prediction training data 118. In this way, the model output manager 108 can train the prediction accuracy model 106 to predict the value of L1 for transactions (Yes or No: is the predicted label accurate?). It is noted that this example prediction accuracy model 106 is merely one possible implementation. In some embodiments of the present disclosure, the prediction accuracy model 106 can include different implementations of prediction training data 118, prediction classifier 120, and prediction classifications 122.

When the client ML model 104 includes a binary classifier, the system 100 may merely include one prediction accuracy model 106. However, for multi-class classifiers, the system 100 may include multiple prediction accuracy models 106, one for each potential label. In such embodiments, each of the prediction accuracy models 106 can include binary classifiers. Thus, each prediction accuracy model 106 merely determines whether a prediction for the associated label is accurate. Thus, if the potential labels include values, "A," "B," "C," and, "D," the system 100 can include a prediction accuracy model with a binary classifier for each of the four potential labels.

At operation 206, the client ML model 104 can generate predictions 116 in response to client transactions. The client transactions can include client transactions 124 described with respect to FIG. 1.

At operation 208, the model output manager 108 can determine whether predictions 116 are accurate. As stated previously, the prediction accuracy model 106, specifically, the prediction classifier 120 is trained to label a prediction 116 as accurate or not. Thus, the model output manager 108 can use the prediction accuracy model 106 to determine whether the predictions 116 are accurate.

At operation 210, the model output manager 108 can provide the client predictions 126 based on the determination. If the determination is that the prediction 116 is accurate, the corresponding client prediction 126 can include the prediction 116. Alternatively, if the determination is that the prediction 116 is inaccurate, the corresponding client prediction 126 can include an updated prediction. The updated prediction can include an alternative label that the model output manager 108 can select from the other potential labels. Additionally, as stated previously, the client predictions 126 can include the probabilities associated with each potential label, and a confidence with which the prediction classifier 120 makes the determination.

Providing the client predictions 126 can vary depending on whether the classifier 114 is a binary or multi-class classifier. Providing the client predictions 126 is described in greater detail with respect to FIGS. 3-5.

Figure 3:
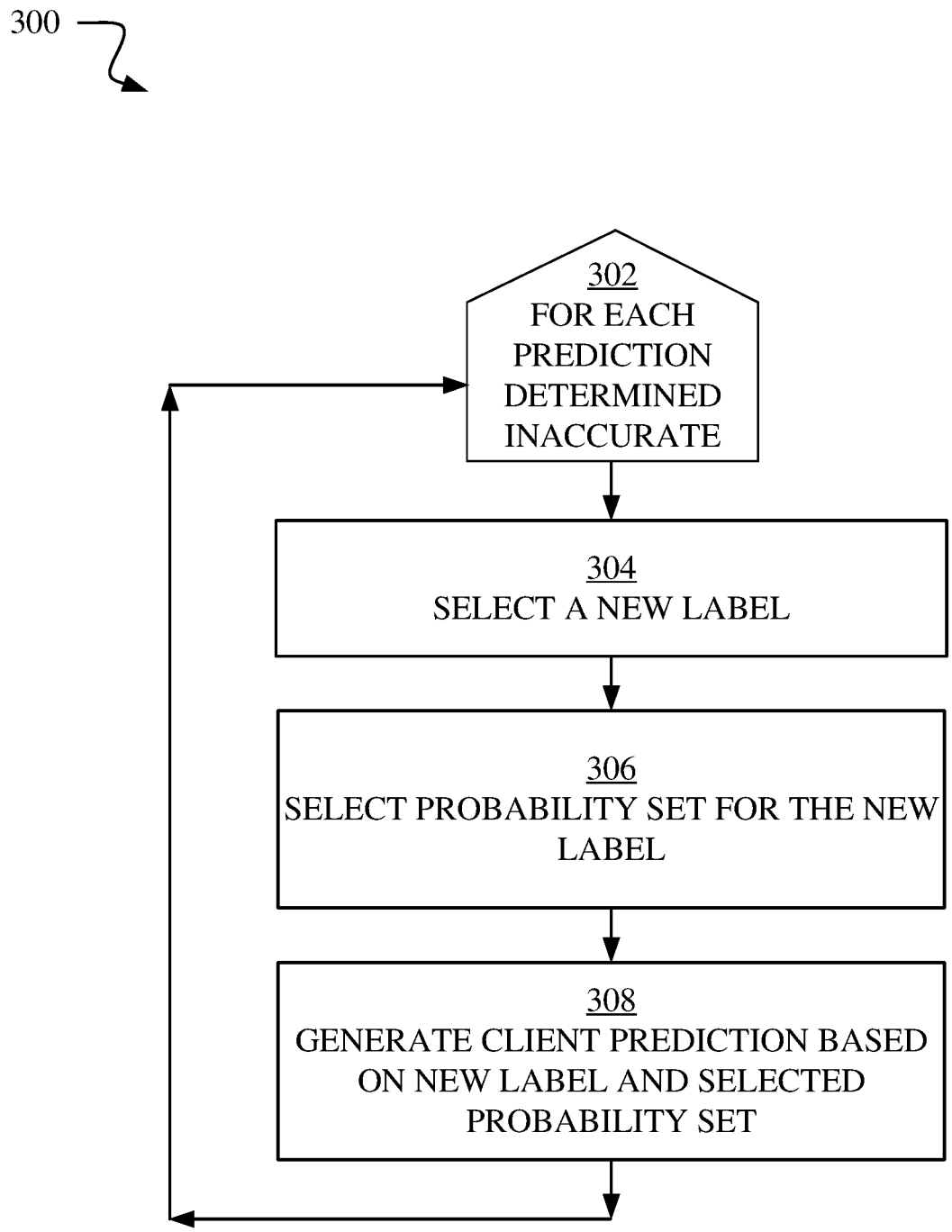
FIG. 3 is a process flow chart of a method for providing client descriptions, in accordance with some embodiments of the present disclosure.

FIG. 3 is a process flow chart of a method 300 for providing client predictions 126, in accordance with some embodiments of the present disclosure. The model output manager 108 can perform the method 300 for an example client ML model 104. In the example client ML model 104, the classifier 114 can be a binary classifier that can select from labels, "classA" and "classB." In some embodiments, the output manager 108 can perform operations 302 through 314 for each prediction 116 that is determined inaccurate (each prediction that the prediction classifier 120 determines is inaccurate). In this example, the classifier 114 may generate an inaccurate prediction indicating the label for a data point, P1, is classA. Additionally, the prediction can indicate the respective probabilities, Pr_P1_A and Pr_P1_B, that the respective classes are accurate labels for data point P1.

At operation 304, the model output manager 108 can select a new label. For a binary classifier, there are merely two labels. Thus, the new label can be the label that the classifier 114 did not select. Thus, because the prediction accuracy model 106 classifies the classA label as inaccurate, the new label can be classB.

In addition to selecting a new label, it can be useful to determine the associated probabilities for the new labeling. Here, for P1, predicted label is classA. Hence, Pr_P1_A>Pr_P1_B. However, if the client prediction 126 includes the new label (classB), the associated probabilities from the prediction 116 directly contradict the new label.

Accordingly, at operation 306, the model output manager 108 can select a probability set for the new label. The probability set refers to the probabilities that each label in a prediction 116 is the accurate label. Thus, the probability set of the original prediction indicates that Pr_P1_A>Pr_P1_B. However, in order to support a client prediction 126 with the new label, the model output manager 108 may select a new probability set wherein Pr_P1_B>Pr_P1_A. In some embodiments, the model output manager 108 can select the probability set from the training data 112 of the client ML model 104.

Supposing the classifier 114 predicts classA with probability 0.7 (70%), meaning the probability of classB being the accurate label is equal to 0.3 (30%), the model output manager 108 can determine a new probability set for the new label. Because the probability set of the prediction supports the classA label, the model output manager 108 can generate a new probability set that supports a classB label. For a binary classifier, the probability, Pr_P1_B can be between the values [0.5, 1]. Determining the probabilities for the new label can vary depending on whether the classifier 114 is a binary or multi-class classifier. Accordingly, determining the probabilities for the new label are described in greater detail with respect to FIGS. 4 and 5, respectively.

At operation 308, the operation manager can generate the client prediction 126 based on the new label and determined probability set. In some embodiments, the model output manager 108 can include a confidence determination with the client prediction 126. The confidence determination can represent a confidence with which the prediction classifier 120 determines that the original prediction is accurate.

Figure 4:
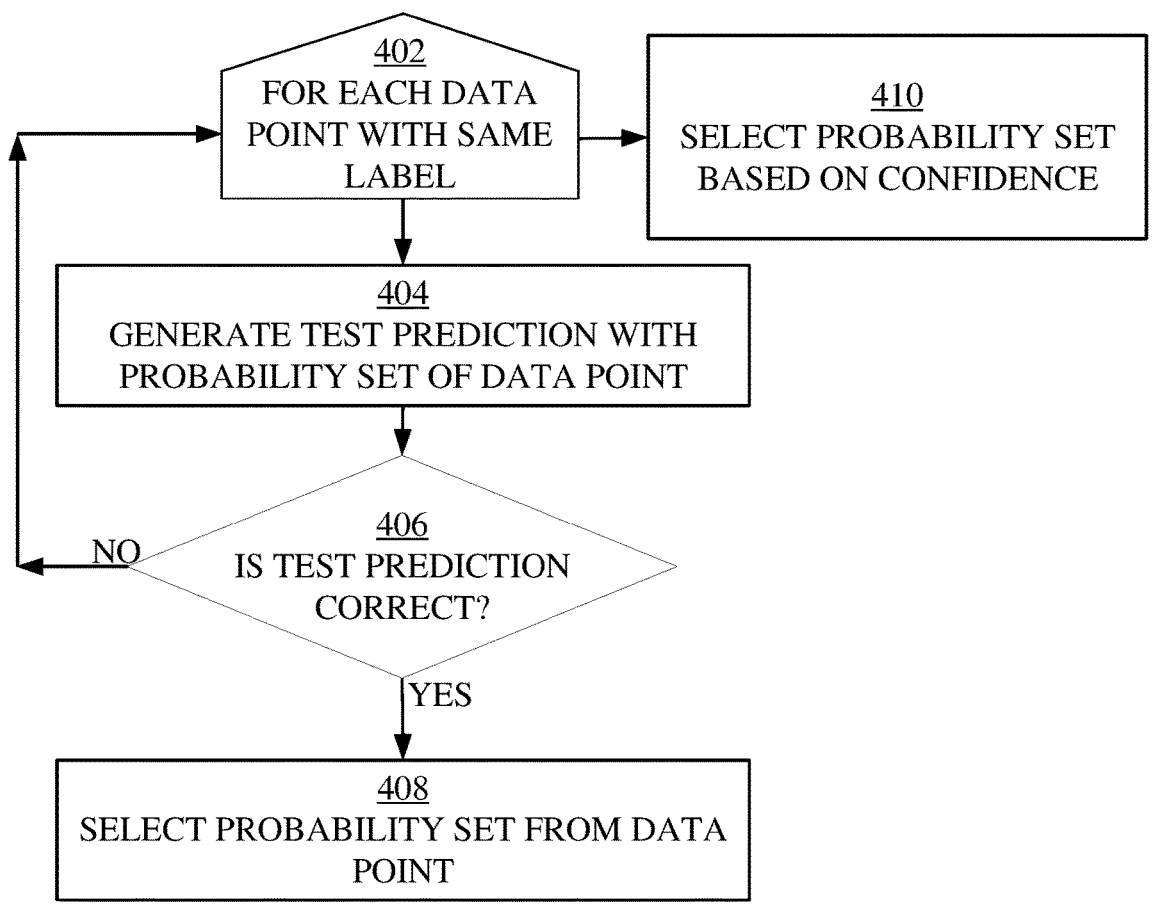
FIG. 4 is a process flow chart of a method for selecting a probability set in association with a binary classifier, in accordance with some embodiments of the present disclosure.

FIG. 4 is a process flow chart of a method 400 for selecting a probability set in association with a binary classifier, in accordance with some embodiments of the present disclosure. If the classifier 114 of the client ML model 104 is a binary classifier, the model output manager 108 can perform the method 400 to select a probability set for the new label. As stated previously, the model output manager 108 can select the probability set for the new label from the training data 112 of the client ML model 104. Accordingly, in embodiments of the present disclosure, the model output manager 108 can perform the operations 402 through 406 for each data point in the training data (training data point) with the same label as the new label. Because the training data 112 can include an accurate label, the probability set for a training data point accurately labeled with the new label can represent a similar likelihood as the current data point with the inaccurate prediction determination.

In some embodiments, the model output manager 108 can perform operations 402 through 406 on training data points based on the distance from the current data point with the inaccurate prediction determination. The distance can represent a similarity between the training data point and the current data point. In other words, the model output manager 108 can perform operations 402 through 406 first on the relatively closest training data point to the current data point. Additionally, the model output manager 108 can perform subsequent iterations of operations 402 through 406 on training data points that are increasingly further from the current data point.

At operation 404, the model output manager 108 can generate a test prediction with a probability set of the data point. Generating a test prediction can involve generating a mock-up of a prediction 116 using the new label and the selected probability set.

At operation 406, the model output manager 108 can determine if the test prediction is correct. More specifically, the model output manager 108 can use the prediction accuracy model 106 to determine if the test prediction is correct. If the test prediction is correct, the method 400 can flow to operation 408. If the test prediction is not correct, the method 400 can flow to operation 402 for the next closest training data point.

At operation 408, the model output manager 108 can select the probability set of the test prediction. Accordingly, the selected probability set can be included in a client prediction 126 with the new label.

Thus, in the above example, for a given data point, P1, with an inaccurate prediction determination, the model output manager 108 can find the nearest training data point, P2, with a prediction of classB. Because the training data point P2 has the relatively closest distance to the current data point, the training data point P2 may be the relatively most similar of the data training points to P1. Accordingly, the model output manager 108 can generate a test prediction using the probability set of training data point P2. For training data point P2, Pr_P2_B>Pr_P2_A. Accordingly, the model output manager 108 generates a test prediction using the probability set of training data point P2. Additionally, the model output manager 108 can ask the prediction accuracy model 106 if the test prediction is correct. Thus, the input to the prediction accuracy model 106 can include the features of data point P1, the new label (classB), and the probability set of training data point P2 (Pr_P2_A and Pr_P2_B). The output from the prediction accuracy model 106 can be a true or false indicating whether the test prediction is correct.

If the prediction accuracy model 106 supports the test prediction for data point P1 with an updated probability set, the model output manager 108 can select the probability set of training data point P2. However, if the prediction accuracy model 106 rejects the test prediction, the model output manager 108 can repeat operations 402 through 406 for the next relatively nearest training data point.

If the model output manager 108 does not find a training data point with the new label, supported by the prediction accuracy model, the method can flow to operation 410. In this way, operation 410 can provide a backup for determining a probability set of the client prediction 126.

At operation 410, the model output manager 108 can select a probability set based on confidence. If the model output manager 108 fails to find any probability set from the nearest training data points, the model output manager 108 can further analyze the output of the prediction accuracy model 106 for each of the considered training data points. In some embodiments, the output of the prediction accuracy model 106 can include a confidence associated with each prediction classification 122. That is, the prediction classifier 120 can indicate that a particular prediction 116 is correct or incorrect with a specific amount of confidence.

Confidence can be represented as a percentage ranging from zero to 100%, wherein zero represents no confidence, and 100% represents 100% confidence. Accordingly, for scenarios where the model output manager 108 cannot find a probability set from the nearest training data points, the model output manager 108 can select the probability set of the nearest data point where a proxy model is least confident that the test prediction is wrong. In other words, if the prediction accuracy model 106 rejects all test predictions, the model output manager 108 can select the probability set from the test prediction that the prediction accuracy model 106 rejects with the comparatively least confidence.

Figure 5:
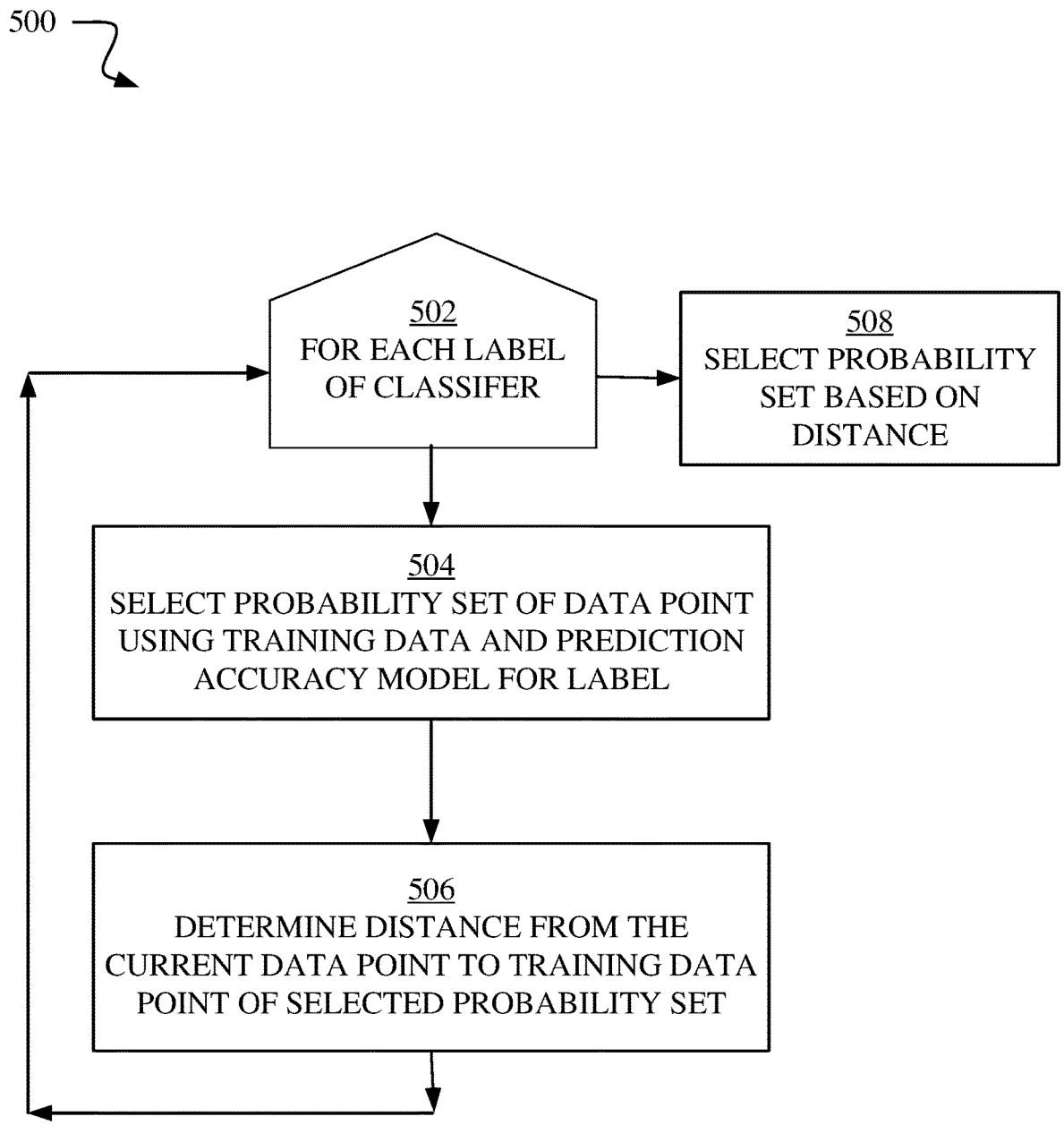
FIG. 5 is a process flow chart of a method for selecting a probability set in association with a multi-class classifier, in accordance with some embodiments of the present disclosure.

FIG. 5 is a process flow chart of a method 500 for selecting a probability set in association with a multi-class classifier, in accordance with some embodiments of the present disclosure. If the classifier 114 of the client ML model 104 is a multi-class classifier, the model output manager 108 can perform the method 500 to select a probability set for the new label. Additionally, the model output manager 108 can perform the operations 502 through 506 for each label of the multi-class classifier. As stated previously, for a client ML model 104 with a multi-class classifier, the model output manager 108 can generate multiple prediction accuracy models 106. Each of the prediction accuracy models 106 can be trained to determine whether, for a given data point, a prediction of the corresponding label is correct.

Accordingly, at operation 504, the model output manager 108 can select a probability set for the current data point using training data 112 and the prediction accuracy model 106 for the label. In some embodiments, the operation 504 can be similar to the method 400 described with respect to FIG. 4.

Referring back to FIG. 5, at operation 506, the model output manager 108 can determine a distance from the current data point to the training data point of the selected probability set. The distance can represent a similarity between the training data point and the current data point. Once the model output manager 108 has selected a probability set for each of the prediction accuracy models 106, the method 500 can flow to operation 508.

At operation 508, the model output manager 108 can select a probability set based on distance. In other words, the model output manager 108 can select the probability set corresponding to the training data point with the comparatively smallest distance from the current data point.

For example, the multi-class classifier can classify client transactions 124 into one of four labels: classA, classB, classC, and classD. Further, for data point P1, the multi-class classifier can predict the label for the client transaction 124 is classA with probability, Pr_P1_A. The probability for the other classes can represented as Pr_P1_B, Pr_P1_C, and Pr_P1_D. Since the predicted label is classA, Pr_P1_A is greater than any of Pr_P1_B, Pr_P1_C, and Pr_P1_D. However, the predicted label, classA, may not be supported by the prediction accuracy model 106. Accordingly, the model output manager 108 can perform the method 500 to select a probability set (Pr_P1_A, Pr_P1_B, Pr_P1_C, Pr_P1_D) wherein the selected class probability is greater than the probabilities of the other classes.

As stated previously, the model output manager 108 can generate a prediction accuracy model 106 for each potential label of a multi-class classifier. Each of these prediction accuracy models 106 can be trained to determine whether predictions of one of the labels are correct, and an indication of confidence. Hence, in this example, the model output manager 108 can generate four prediction accuracy models 106: prediction accuracy (PA)_Model_A, PA_Model_B, PA_Model_C, and PA_Model_D. The PA_Model_A can make a determination whether a client ML model prediction of classA is correct or not. Similarly, PA_Model_B can make a determination whether a client ML model prediction of classB is correct or not, and alike for PA-Model_C and PA_Model_D. Additionally, the PA_Model_A, PA_Model_B, PA_Model_C, and PA_Model_D can also output the confidence with which the prediction classifier 120 makes the determination.

Given these prediction accuracy models 106, the model output manager 108 can convert the problem of multi-class classification into a combination of binary classification problems. Accordingly, the model output manager can solve each binary-class problem using the method 400 described with respect to FIG. 4.

Figure 6:
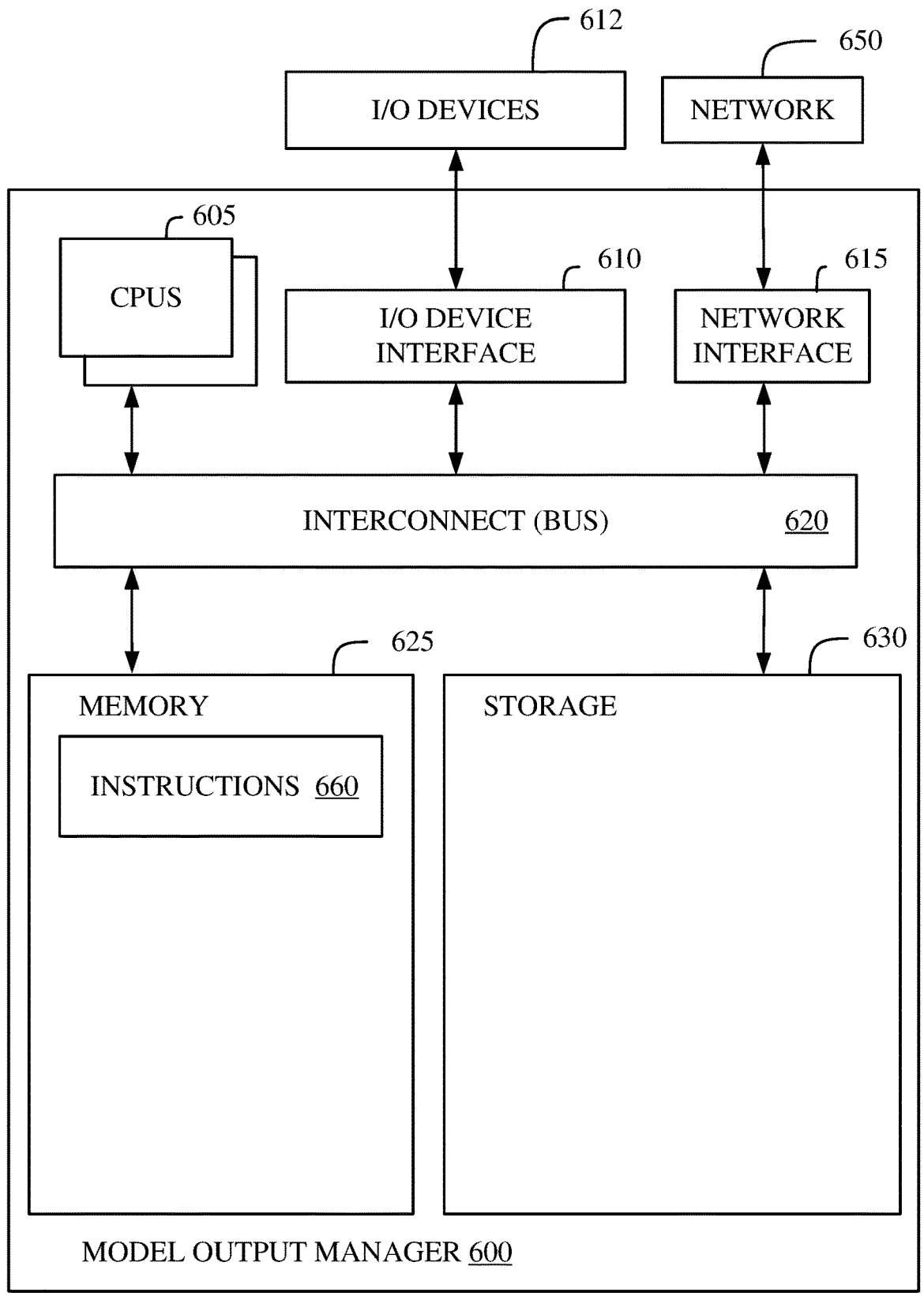
FIG. 6 is a block diagram of an example model output manager, in accordance with some embodiments of the present disclosure.

FIG. 6 is a block diagram of an example model output manager 600, in accordance with some embodiments of the present disclosure. In various embodiments, the model output manager 600 is similar to the model output manager 108 and can perform the method described in FIGS. 2-5 and/or the functionality discussed in FIG. 1. In some embodiments, the model output manager 600 provides instructions for the aforementioned methods and/or functionalities to a client machine such that the client machine executes the method, or a portion of the method, based on the instructions provided by the model output manager 600. In some embodiments, the model output manager 600 comprises software executing on hardware incorporated into a plurality of devices.

The model output manager 600 includes a memory 625, storage 630, an interconnect (e.g., BUS) 620, one or more CPUS 605 (also referred to as processors 605 herein), an I/O device interface 610, I/O devices 612, and a network interface 615.

Each CPU 605 retrieves and executes programming instructions stored in the memory 625 or the storage 630. The interconnect 620 is used to move data, such as programming instructions, between the CPUs 605, I/O device interface 610, storage 630, network interface 615, and memory 625. The interconnect 620 can be implemented using one or more busses. The CPUs 605 can be a single CPU, multiple CPUs, or a single CPU having multiple processing cores in various embodiments. In some embodiments, a CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random access memory (e.g., static random access memory (SRAM), dynamic random access memory (DRAM), or Flash). The storage 630 is generally included to be representative of a non-volatile memory, such as a hard disk drive, solid state device (SSD), removable memory cards, optical storage, and/or flash memory devices. Additionally, the storage 630 can include storage area-network (SAN) devices, the cloud, or other devices connected to the model output manager 600 via the I/O device interface 610 or to a network 650 via the network interface 615.

In some embodiments, the memory 625 stores instructions 660. However, in various embodiments, the instructions 660 are stored partially in memory 625 and partially in storage 630, or they are stored entirely in memory 625 or entirely in storage 630, or they are accessed over a network 650 via the network interface 615.

Instructions 660 can be processor-executable instructions for performing any portion, or all, of any of the methods described in FIGS. 2-5 and/or the functionality discussed in FIG. 1.

In various embodiments, the I/O devices 612 include an I/O device interface 610 capable of presenting information and receiving input. For example, I/O devices 612 can present information to a listener interacting with model output manager 600 and receive input from the listener.

The model output manager 600 is connected to the network 650 via the network interface 615. Network 650 can comprise a physical, wireless, cellular, or different network.

In some embodiments, the model output manager 600 can be a multi-user mainframe computer system, a single-user system, or a server computer or similar device that has little or no direct user interface but receives requests from other computer systems (clients). Further, in some embodiments, the model output manager 600 can be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary model output manager 600. In some embodiments, however, individual components can have greater or lesser complexity than as represented in FIG. 6, components other than or in addition to those shown in FIG. 6 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
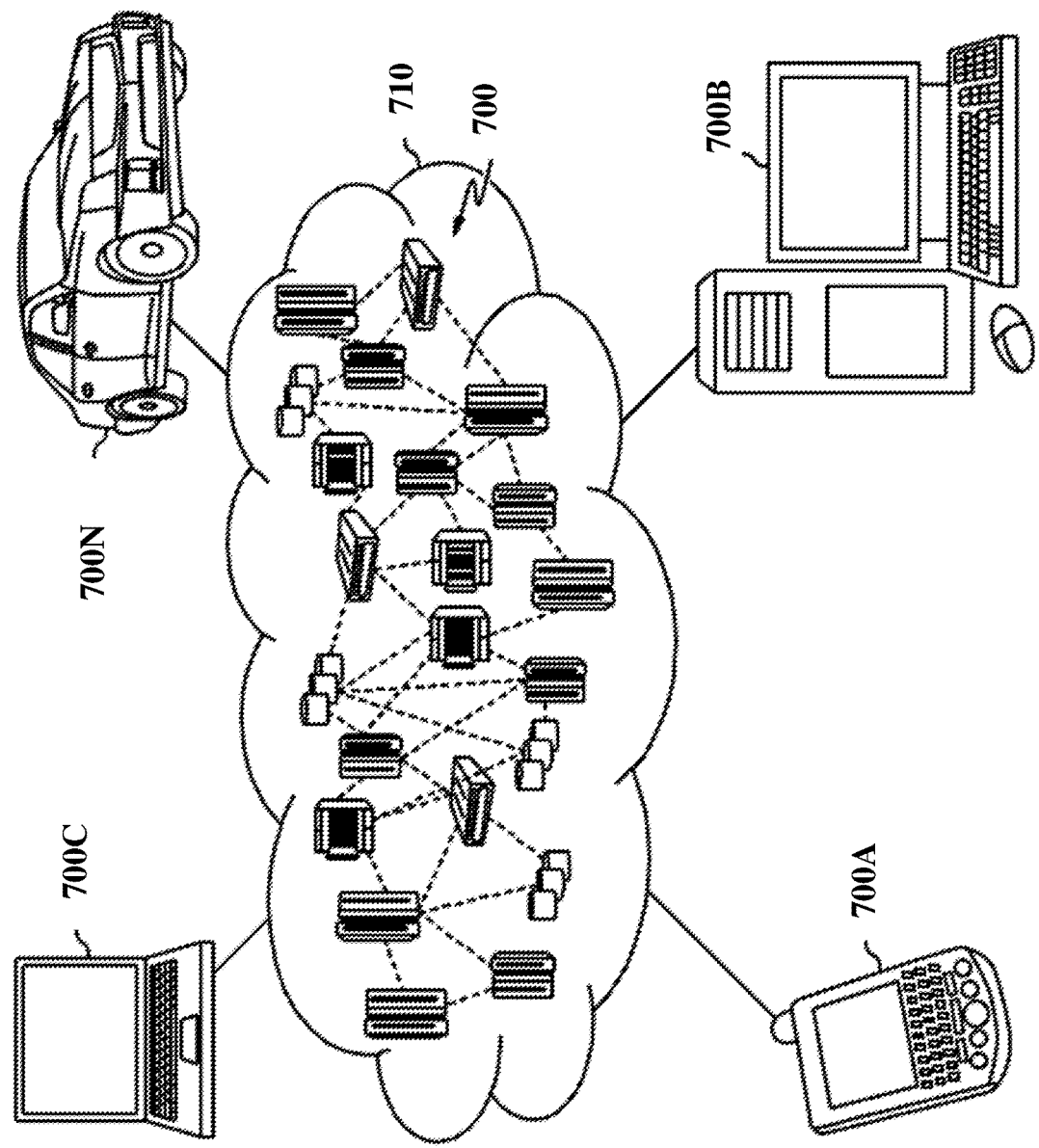
FIG. 7 is a cloud computing environment, according to some embodiments of the present disclosure.

FIG. 7 is a cloud computing environment 710, according to some embodiments of the present disclosure. As shown, cloud computing environment 710 includes one or more cloud computing nodes 700. The cloud computing nodes 700 can perform the methods described in FIGS. 2-5 and/or the functionality discussed in FIG. 1. Additionally, cloud computing nodes 700 can communicate with local computing devices used by cloud consumers, such as, for example, personal digital assistant (PDA) or cellular telephone 700A, desktop computer 700B, laptop computer 700C, and/or automobile computer system 700N. Further, the cloud computing nodes 700 can communicate with one another. The cloud computing nodes 700 can also be grouped (not shown) physically or virtually, in one or more networks, such as Private, Community, Public, or Hybrid clouds as described hereinabove, or a combination thereof. This allows cloud computing environment 710 to offer infrastructure, platforms and/or software as services for which a cloud consumer does not need to maintain resources on a local computing device. It is understood that the types of computing devices 700A-N shown in FIG. 7 are intended to be illustrative only and that computing nodes 700 and cloud computing environment 710 can communicate with any type of computerized device over any type of network and/or network addressable connection (e.g., using a web browser).

Figure 8:
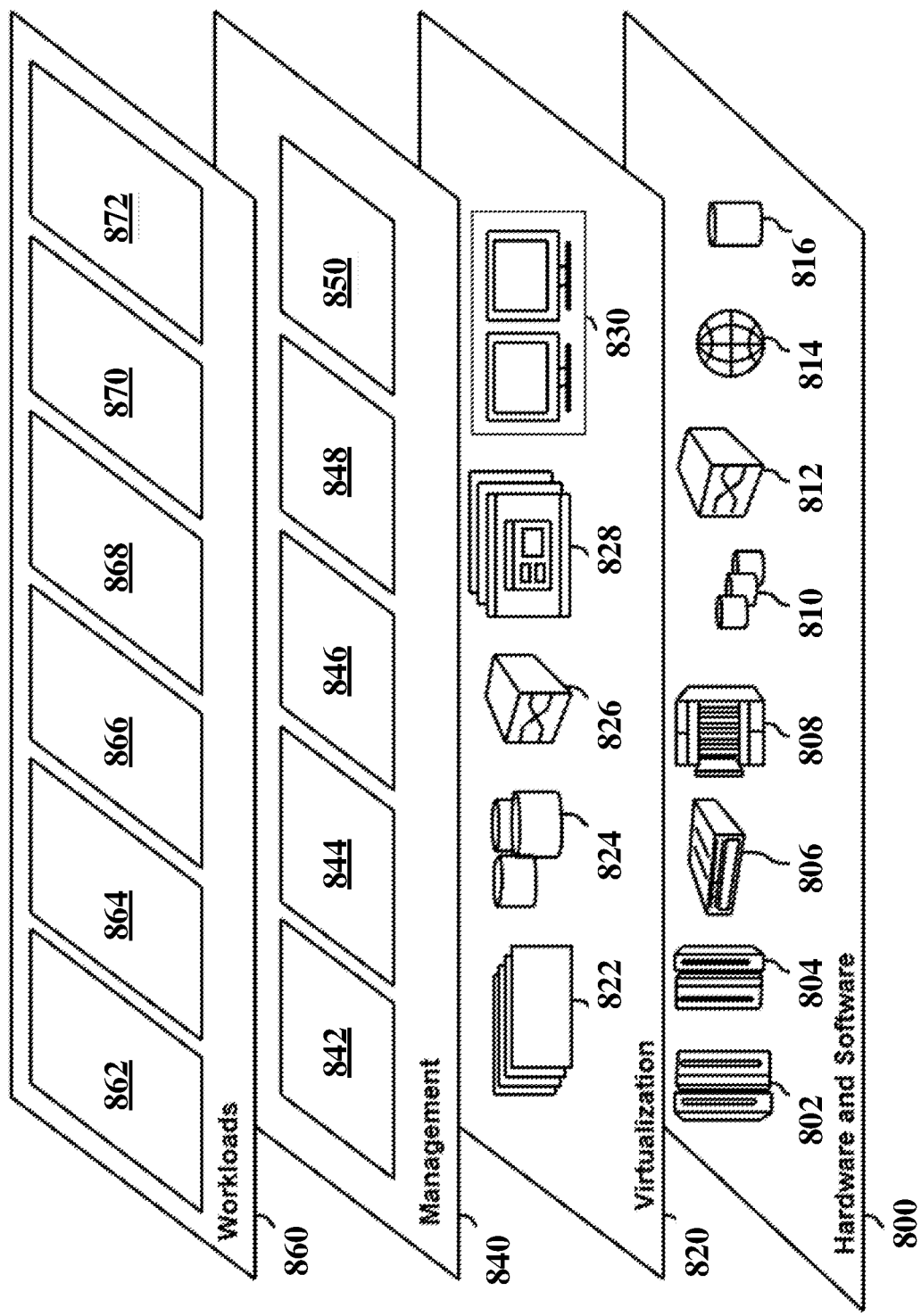
FIG. 8 is a set of functional abstraction model layers provided by a cloud computing environment, according to some embodiments of the present disclosure, is shown.

FIG. 8 is a set of functional abstraction model layers provided by cloud computing environment 710 (FIG. 7), according to some embodiments of the present disclosure. It should be understood in advance that the components, layers, and functions shown in FIG. 8 are intended to be illustrative only and embodiments of the disclosure are not limited thereto. As depicted below, the following layers and corresponding functions are provided.

Hardware and software layer 800 includes hardware and software components. Examples of hardware components include: mainframes 802; RISC (Reduced Instruction Set Computer) architecture based servers 804; servers 806; blade servers 808; storage devices 810; and networks and networking components 812. In some embodiments, software components include network application server software 814 and database software 816.

Virtualization layer 820 provides an abstraction layer from which the following examples of virtual entities can be provided: virtual servers 822; virtual storage 824; virtual networks 826, including virtual private networks; virtual applications and operating systems 828; and virtual clients 830.

In one example, management layer 840 can provide the functions described below. Resource provisioning 842 provides dynamic procurement of computing resources and other resources that are utilized to perform tasks within the cloud computing environment. Metering and Pricing 844 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 846 provides access to the cloud computing environment for consumers and system administrators. Service level management 848 provides cloud computing resource allocation and management such that required service levels are met. Service level management 848 can allocate suitable processing power and memory to process static sensor data. Service Level Agreement (SLA) planning and fulfillment 850 provide pre-arrangement for, and procurement of, cloud computing resources for which a future requirement is anticipated in accordance with an SLA.

Workloads layer 860 provides examples of functionality for which the cloud computing environment can be utilized. Examples of workloads and functions which can be provided from this layer include: mapping and navigation 862; software development and lifecycle management 864; virtual classroom education delivery 866; data analytics processing 868; transaction processing 870; and model output management 872.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for machine-learning model accuracy, comprising:
   determining, by a computer processor and using a prediction accuracy machine-learning model, a first confidence that a first prediction generated, for a first data point of a client transaction, and by a classifier of a machine-learning model is accurate by:
      generating, by the computer processor, prediction training data comprising, for each of a plurality of training transactions of the machine-learning model:
         a data point;
         a training prediction made by the classifier for the data point;
         an indication whether the training prediction is accurate;
         a first probability that the machine learning model determines that the training prediction is accurate; and
         a second probability that that the machine learning model determines that an alternative prediction is accurate;
   training, by the computer processor, the prediction accuracy machine-learning model to determine a client confidence that a client prediction generated by the machine-learning model is accurate using the prediction training data; and
   generating, using the prediction accuracy machine-learning model:
      a second prediction for the first data point; and
      the first confidence, wherein the first confidence is equal to a second confidence that the second prediction is accurate;
   wherein the first prediction represents a machine-learning classification of a corresponding client transaction.

2. The computer-implemented method of claim 1, further comprising:
   selecting, by the computer processor and using the prediction accuracy model, a new prediction for the corresponding client transaction; and
   providing, by the computer processor, the new prediction for a client of the corresponding client transaction, wherein providing the new prediction comprises, selecting a new label based on a predicted label of the first prediction;
   selecting a probability set for the new label, wherein selecting the probability set comprises:
      selecting a training data point from training data of the machine-learning model having:
         a nearest distance to the data point; and
         a same label value as the new label:
      generating a test prediction based on a training probability set associated with the training data point;
      determining whether the test prediction is accurate using the prediction accuracy machine-learning model; and
      selecting the probability set associated with the training data point based on the determination; and
      generating a client prediction based on the new label and the probability set.

3. The computer-implemented method of claim 2, further comprising:
   determining that the test prediction is inaccurate for all training data points of the machine-learning model; and
   selecting a probability set based on a confidence associated with the determination that the test prediction is inaccurate.

4. The computer-implemented method of claim 2 wherein the classifier of the machine-learning model is a multi-class classifier.

5. The computer-implemented method of claim 4, further comprising:
   training a plurality of prediction accuracy models corresponding to a plurality of classes of the multi-class classifier, wherein selecting the probability set comprises:
      selecting a plurality of probability sets corresponding to the classes based on the training data for the machine-learning model and one of the prediction accuracy models corresponding to a selected class;
      determining a plurality of distances from each of a plurality of training data points to the data point associated with the first prediction; and
      selecting the probability set based on the distances.

6. A system, comprising:
   a memory device storing instructions; and
   a computer processor configured to execute the instructions to perform a method comprising:
      determining, by the computer processor and using a prediction accuracy machine-learning model, a first confidence that a first prediction generated, for a first data point of a client transaction, and by a classifier of a machine-learning model is accurate by:
         generating, by the computer processor, prediction training data comprising, for each of a plurality of training transactions of the machine-learning model:
            a data point;
            a training prediction made by the classifier for the data point;
            an indication whether the training prediction is accurate;
            a first probability that the machine learning model determines that the training prediction is accurate; and
            a second probability that that the machine learning model determines that an alternative prediction is accurate;
         training, by the computer processor, the prediction accuracy machine-learning model to determine a client confidence that a client prediction generated by the machine-learning model is accurate using the prediction training data; and
generating, using the prediction accuracy machine-learning model:
a second prediction for the first data point; and
the first confidence, wherein the first confidence is equal to a second confidence that the second prediction is accurate;
wherein the first prediction represents a machine-learning classification of a corresponding client transaction.

7. The system of claim 6, the method further comprising:
further comprising:
selecting, by the computer processor and using the prediction accuracy model, a new prediction for the corresponding client transaction; and
providing, by the computer processor, the new prediction for a client of the corresponding client transaction, wherein providing the new prediction comprises,
selecting a new label based on a predicted label of the first prediction;
selecting a probability set for the new label, wherein selecting the probability set comprises:
selecting a training data point from training data of the machine-learning model having:
a nearest distance to the data point; and
a same label value as the new label:
generating a test prediction based on a training probability set associated with the training data point;
determining whether the test prediction is accurate using the prediction accuracy machine-learning model; and
selecting the probability set associated with the training data point based on the determination; and
generating a client prediction based on the new label and the probability set.

8. The system of claim 7, the method further comprising:
determining that the test prediction is inaccurate for all training data points of the machine-learning model; and
selecting a probability set based on a confidence associated with the determination that the test prediction is inaccurate.

9. The system of claim 7, wherein the classifier of the machine-learning model is a multi-class classifier.

10. The system of claim 9, the method further comprising:
training a plurality of prediction accuracy models corresponding to a plurality of classes of the multi-class classifier, wherein selecting the probability set comprises:
selecting a plurality of probability sets corresponding to the classes based on the training data for the machine-learning model and one of the prediction accuracy models corresponding to a selected class;
determining a plurality of distances from each of a plurality of training data points to the data point associated with the first prediction; and
selecting the probability set based on the distances.

11. A computer program product comprising program instructions stored on a computer readable storage medium, the program instructions executable by a computer processor to cause the processor to perform a method comprising:
determining, by the computer processor and using a prediction accuracy machine-learning model, a first confidence that a first prediction generated, for a first data point of a client transaction, and by a classifier of a machine-learning model is accurate by:
generating, by the computer processor, prediction training data comprising, for each of a plurality of training transactions of the machine-learning model:
a data point;
a training prediction made by the classifier for the data point;
an indication whether the training prediction is accurate;
a first probability that the machine learning model determines that the training prediction is accurate; and
a second probability that that the machine learning model determines that an alternative prediction is accurate;
training, by the computer processor, the prediction accuracy machine-learning model to determine a client confidence that a client prediction generated by the machine-learning model is accurate using the prediction training data; and
generating, using the prediction accuracy machine-learning model:
a second prediction for the first data point; and
the first confidence, wherein the first confidence is equal to a second confidence that the second prediction is accurate;
wherein the first prediction represents a machine-learning classification of a corresponding client transaction.

12. The computer program product of claim 11, the method further comprising:
selecting, by the computer processor and using the prediction accuracy model, a new prediction for the corresponding client transaction; and
providing, by the computer processor, the new prediction for a client of the corresponding client transaction, wherein providing the new prediction comprises,
selecting a new label based on a predicted label of the first prediction;
selecting a probability set for the new label, wherein selecting the probability set comprises:
selecting a training data point from training data of the machine-learning model having:
a nearest distance to the data point; and
a same label value as the new label:
generating a test prediction based on a training probability set associated with the training data point;
determining whether the test prediction is accurate using the prediction accuracy machine-learning model; and
selecting the probability set associated with the training data point based on the determination; and
generating a client prediction based on the new label and the probability set.

13. The computer program product of claim 12, the method further comprising:
determining that the test prediction is inaccurate for all training data points of the machine-learning model; and
selecting a probability set based on a confidence associated with the determination that the test prediction is inaccurate.

14. The computer program product of claim 12, wherein the classifier of the machine-learning model is a multi-class classifier.

15. The computer program product of claim 14, the method further comprising:

training a plurality of prediction accuracy models corresponding to a plurality of classes of the multi-class classifier, wherein selecting the probability set comprises:
  selecting a plurality of probability sets corresponding to the classes based on the training data for the machine-learning model and one of the prediction accuracy models corresponding to a selected class;
  determining a plurality of distances from each of a plurality of training data points to the data point associated with the first prediction; and
  selecting the probability set based on the distances.

16. A computer-implemented method for machine-learning model accuracy, comprising:
  determining, by a computer processor and using a prediction accuracy machine-learning model, a first confidence that a first prediction generated, for a first data point of a client transaction, and by a classifier of a machine-learning model is accurate by:
    generating, by the computer processor, prediction training data comprising, for each of a plurality of training transactions of the machine-learning model:
      a data point;
      a training prediction made by the classifier for the data point;
      an indication whether the training prediction is accurate;
      a first probability that the machine learning model determines that the training prediction is accurate; and
      a second probability that that the machine learning model determines that an alternative prediction is accurate;
    training, by the computer processor, the prediction accuracy machine-learning model to determine a client confidence that a client prediction generated by the machine-learning model is accurate using the prediction training data; and
    generating, using the prediction accuracy machine-learning model:
      a second prediction for the first data point; and
      the first confidence, wherein the first confidence is equal to a second confidence that the second prediction is accurate;
  wherein the first prediction represents a machine-learning classification of a corresponding client transaction;
  selecting, by the computer processor, and using the prediction accuracy model, a new prediction for the corresponding client transaction;
  providing, by the computer processor, the new prediction for a client of the corresponding client transaction, wherein providing the new prediction comprises:
  selecting a new label based on a predicted label of the first prediction;
  selecting a probability set for the new label; and
  generating a client prediction based on the new label and the probability set.

17. The computer-implemented method of claim 16, wherein selecting the probability set comprises:
  selecting a training data point from training data of the machine-learning model having:
    a nearest distance to the data point; and
    a same label value as the new label:
  generating a test prediction based on a training probability set associated with the training data point;
  determining whether the test prediction is accurate using the prediction accuracy machine-learning model; and
  selecting the probability set associated with the training data point based on the determination.

18. A computer-implemented method for machine-learning model accuracy, comprising:
  determining, by a computer processor and using a prediction accuracy machine-learning model, a first confidence that a first prediction generated, for a first data point of a client transaction, and by a classifier of a machine-learning model is accurate by:
    generating, by the computer processor, prediction training data comprising, for each of a plurality of training transactions of the machine-learning model:
      a data point;
      a training prediction made by the classifier for the data point;
      an indication whether the training prediction is accurate;
      a first probability that the machine learning model determines that the training prediction is accurate; and
      a second probability that that the machine learning model determines that an alternative prediction is accurate;
    training, by the computer processor, the prediction accuracy machine-learning model to determine a client confidence that a client prediction generated by the machine-learning model is accurate using the prediction training data; and
    generating, using the prediction accuracy machine-learning model:
      a second prediction for the first data point; and
      the first confidence, wherein the first confidence is equal to a second confidence that the second prediction is accurate;
  wherein the first prediction represents a machine-learning classification of a corresponding client transaction;
  selecting, by the computer processor, and using the prediction accuracy model, a new prediction for the corresponding client transaction; and
  providing, by the computer processor, the new prediction for a client of the corresponding client transaction, wherein providing the new prediction comprises:
  selecting a new label based on a predicted label of the first prediction;
    selecting a probability set for the new label, wherein selecting the probability set comprises comprises:
    selecting a training data point from training data of the machine-learning model having:
    a nearest distance to the data point; and
    a same label value as the new label:
    generating a test prediction based on a training probability set associated with the training data point;
    determining that the test prediction is inaccurate for all training data points of the machine-learning model; and
    selecting the probability set based on a confidence associated with the determination that the test prediction is inaccurate; and
  generating a client prediction based on the new label and the probability set.

19. The computer-implement method of claim 18, comprising:
  training a plurality of prediction accuracy models corresponding to a plurality of classes of a multi-class classifier, wherein the classifier comprises the multi-class classifier, and wherein selecting the probability set comprises:

selecting a plurality of probability sets corresponding to the classes based on the training data for the machine-learning model and one of the prediction accuracy models corresponding to a selected class;
determining a plurality of distances from each of a plurality of training data points to the data point associated with the first prediction; and
selecting the probability set based on the distances.

\* \* \* \* \*